United States Patent [19]

Green et al.

[11] 3,824,547

[45] July 16, 1974

[54] COMMUNICATIONS SYSTEM WITH ERROR DETECTION AND RETRANSMISSION

[75] Inventors: Wendel C. Green, Annandale, Va.; Charles W. Bebster; Patrick J. Sharkitt, both of Silver Spring, Md.; Richard R. Hayden, Washington, D.C.

[73] Assignee: Sigma Systems, Inc., Arlington, Va.

[22] Filed: Nov. 29, 1972

[21] Appl. No.: 298,878

[52] U.S. Cl. .................................... 340/146.1 BA

[51] Int. Cl. ..................... G06f 11/10, G08c 25/00

[58] Field of Search ............... 340/146.6 BA, 172.5; 178/23 A

[56] References Cited

UNITED STATES PATENTS

| | | | |
|---|---|---|---|
| 2,970,189 | 1/1961 | Van Dalen et al. | 340/146.1 BA |
| 3,208,049 | 9/1965 | Doty et al. | 340/146.1 BA |
| 3,359,543 | 12/1967 | Corr et al. | 340/172.5 |
| 3,388,378 | 6/1968 | Steeneck et al. | 340/146.1 BA |
| 3,641,494 | 3/1972 | Perrault | 340/146.1 BA |
| 3,648,256 | 3/1972 | Zygielbaum et al. | 340/172.5 |
| 3,676,846 | 7/1972 | Busch | 340/146.1 BA |

*Primary Examiner*—Charles E. Atkinson
*Attorney, Agent, or Firm*—Bacon and Thomas

[57] ABSTRACT

A bi-directional data communication system in which positive and negative acquisition signals are utilized to inform the transmitting station as to any errors in the reception of a message. The system employs both character parity and message parity error detection and each station contains buffer storage message areas for both transmitted and received messages. Messages are retained in the buffer storage areas until a positive acquisition pulse is received by the transmitting station. Upon receipt of a negative acquisition pulse, indicating an error in reception, the transmitting station re-transmits the entire message stored in the buffer area. Time-out circuits are also provided to cause the transmitting messages to be repeated in the event of line distortion of the positive or negative acquistion pulses.

11 Claims, 12 Drawing Figures

COMMUNICATIONS SYSTEM WITH ERROR DETECTION AND RETRANSMISSION

BACKGROUND OF THE INVENTION

1. Field of the Invention

The invention relates to a bi-directional data communication system for transmitting and receiving messages between remote stations and for insuring accurate reception of messages by repeating the transmitted message if any errors are detected.

2. Description of the Prior Art

Data communication systems which provide for error correction facilities by means of repeating the transmitted message are known in the prior art and discussed in the Perrault U.S. Pat. No. 3,641,494 and Avery U.S. Pat. No. 3,452,330. In such systems, a repetition request word is transmitted by the receiving station upon detection of an error. Timing and counting circuits are then employed in the receiving or transmitting stations to insure that the proper number of characters are disregarded by the receiving station in preparation for the retransmission of the message.

The use of error detection means, such as character and message parity checking circuits is illustrated in the Jablonski U.S. Pat. No. 3,525,077 and Cohen et al U.S. Pat. No. 3,460,117. As discussed in the Jablonski patent, the use of message or block parity characters is well-known in multi-branch communication systems which may be, for example, connected together over telephone lines. Various parity checking schemes are known in the prior art and are illustrated in the Cohen U.S. Pat. No. 3,460,117.

SUMMARY OF THE INVENTION

The present invention is designed to provide a communication link between a centrally located computer and various remote terminals, each remote terminal having a plurality of input-output devices for receiving and transmitting data to and from the central computer. It is contemplated that the central communication computer is a mini-computer designed primarily for data computation. The communication system then enables the mini-computer to handle the necessary data correction, transmission and reception with a minimum of "steal" time from the central processor.

The communication system is particularly adapted to ensure accurate transmission and reception of data by utilizing a positive and negative acquisition signal which may be generated and received at both the central and remote stations. The present invention eliminates the necessity of clocking and counting circuits to keep track of the number of words received subsequent to the erroneous character or the time interval between the error character and the beginning of the retransmitted signal. The use of the positive acquisition, or PAK, signal and the negative acquisition, or NAK, signal allows for a simple, compact controller design which can handle the communication processing with a minimum of interruptions of the central processor.

The remote terminals in the communication system are supplied with time-out circuits which insure that no hang-up occurs between the central computer and the remote sites. For example, if a message sent to the central site from a remote site was distorted by noise pulses in the telephone link, a PAK pulse would not be sent back to the transmitting remote station. As a result, the time-out circuit, after a fixed short interval of time, for example, one second, initiates a retransmission of the message from the remote site to the central terminal.

BRIEF DESCRIPTION OF THE DRAWINGS

A complete understanding of the present and of the above and other objects thereof, will be apparent to those skilled in the art upon consideration of the following detailed description taken in conjunction with the accompanying drawings wherein.

Figures 3, 5A, 5B, 5C, 8:
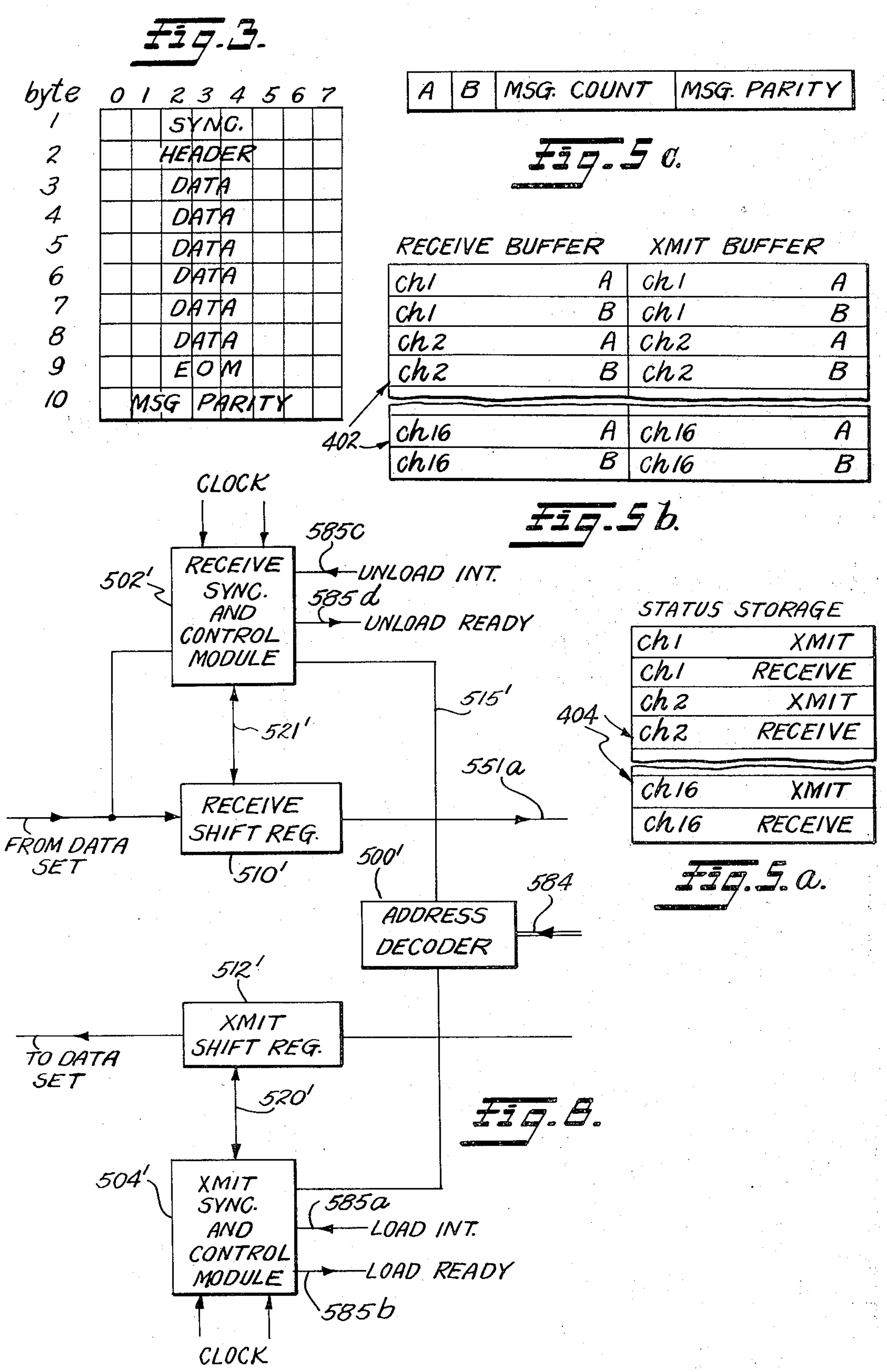
FIG. 3 is an illustration of the message format.
Figure 6:
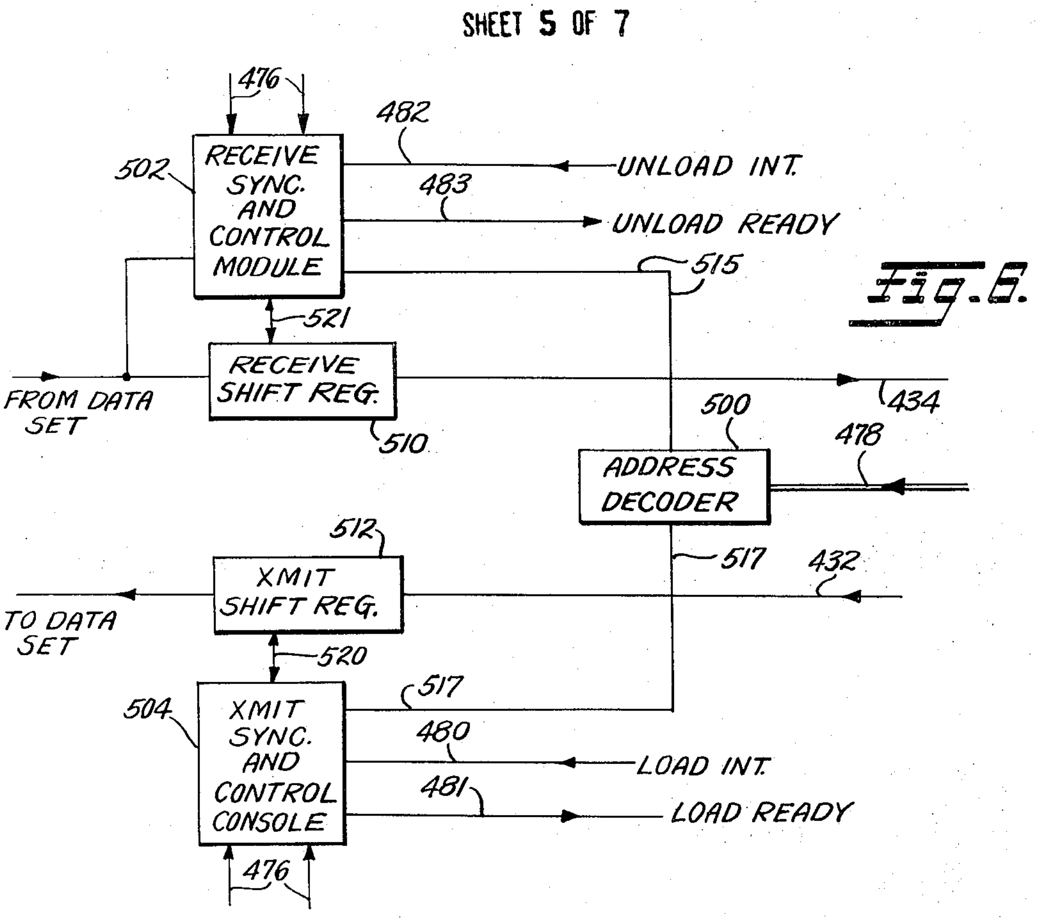
Figure 9:
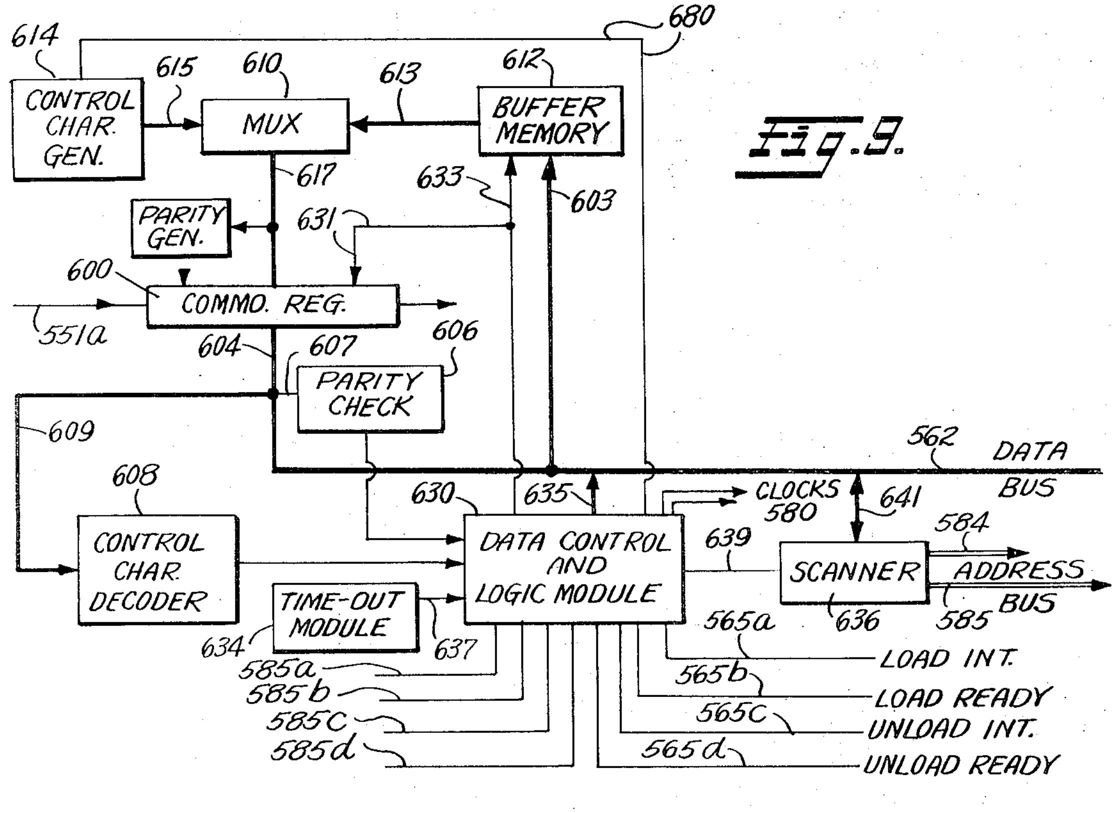
Figure 7:
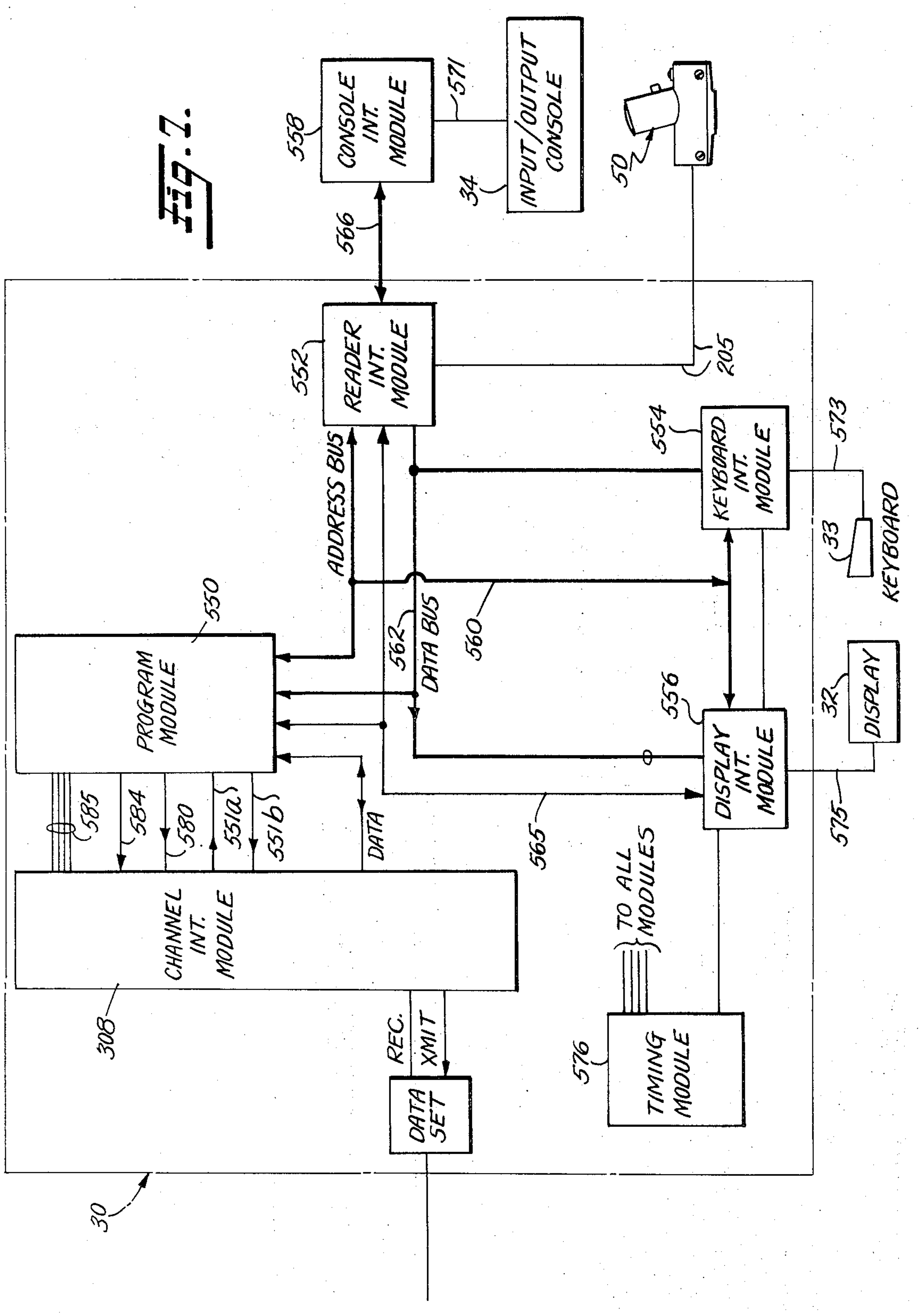

FIG. **5*a*** is an illustration of the status word storage structure in the computer memory;

FIG. **5*b*** is an illustration of the message word storage structure in the computer memory;

FIG. **5*c*** is an illustration of the status word format;

FIG. 6 is a block diagram of the channel interface module located at the central terminal;

FIG. 7 is a block diagram of the remote site branch controller;

FIG. 8 is a block diagram of the channel interface module located at the remote site; and FIG. 9 is a block diagram of the program module of the branch controller of FIG. 7.

Figure 10:
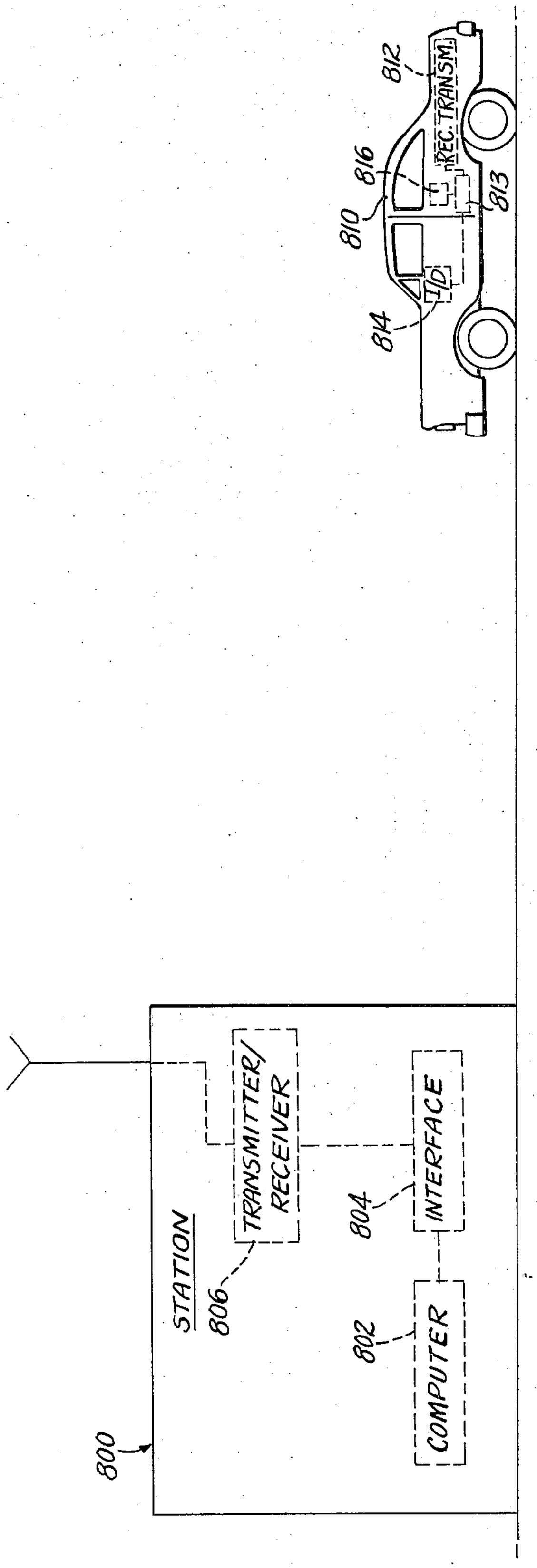

FIG. 10 illustrates the use of the communication system for transmitting messages to and from a remote site utilizing radio waves instead of telephone lines.

DESCRIPTION OF THE PREFERRED EMBODIMENT SYSTEM COMMUNICATION

1. System Overview

Figure 1:
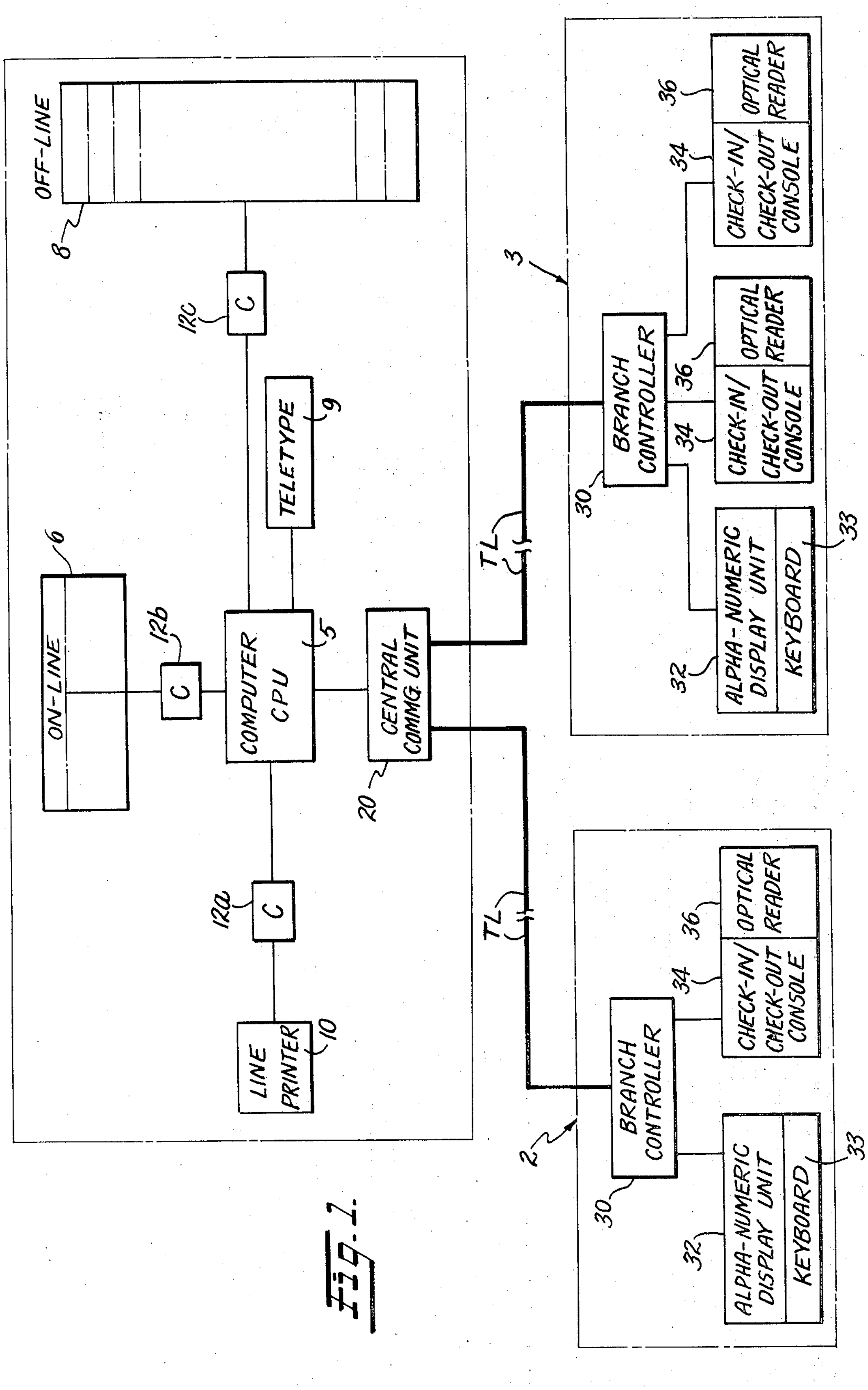
FIG. 1 is a block diagram of the communications system.

FIG. 1 illustrates an overall view of the present invention as embodied in a computerized library system. It is understood, however, that the invention is applicable in a large number of communication systems and the description in terms of a library circulation system is merely an example.

As illustrated in FIG. 1, a central office 1 is connected by telephone links TL to a plurality of branch library sites 2 and 3. Although the diagram shows two branches, it is understood that any number of local sites may be included in the system. The central provides for data processing and file storage and comprises a central processing unit 5 connected to a plurality of on-line storage devices 6 and off-line storage devices 8. The central computer, which may be, for example, a Nova model 1200 is connected to a teletype 9. The computer is also connected to a printer 10 through a controller **12*a*. Additional controllers 12*b* and 12*c* connect the central processing unit 5 to the on-line and off-line memory storage devices respectively. Information stored on the on-line files is transmitted to the central site by a central communication unit 20. This unit contains the essential interface controllers and data sets needed to convert the parallel data of the central processor into serial form for transmission over the telephone link TL. Unit 20** also provides for error checking of incoming messages going to the computer and handles message control, word reception and transmission.

Each library contains a branch controller 30 connected to the telephone link TL for receiving and transmitting serial data. The branch controllers are connected to a plurality of input/output devices such as an alpha-numeric display unit 32, keyboard 33, check-in/check-out console 34 and an optical reader 36. The input/output devices listed above are by way of illustration only and any appropriate input/output device may be utilized for the particular communications system employed. In the present embodiment, the number of input and output devices may vary with the size of the library branch and the user requirements. For exapmle, the library branch 3 contains two check-in/check-out consoles 34 together with associated optical readers 36, whereas branch 2 contains only one console 34 and one reader 36.

Figure 2:
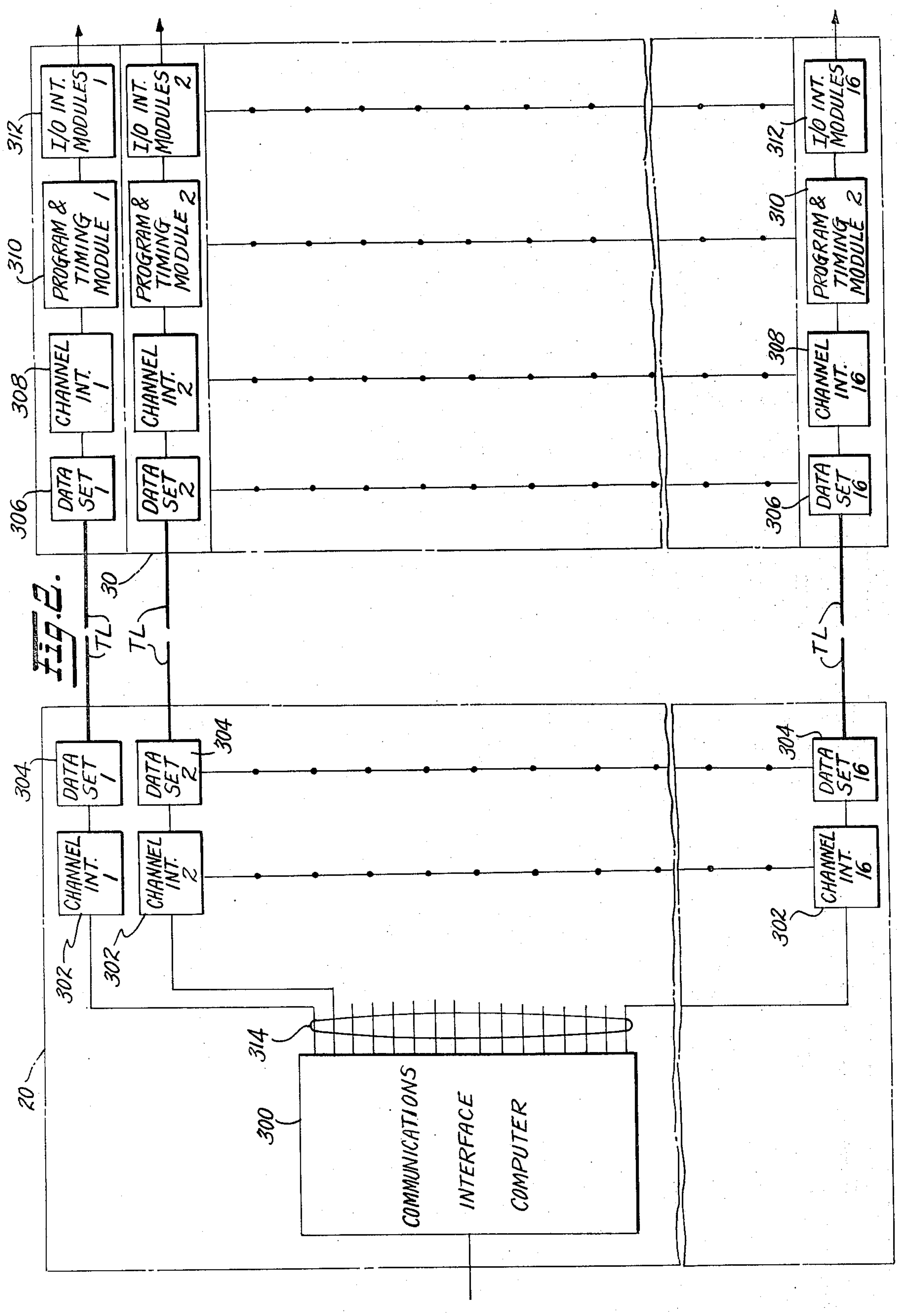
FIG. 2 is a block diagram of the communications handling system showing the components of the branch controller.

FIG. 2 illustrates the general layout of the central communication unit 20 and the individual branch controllers 30 which are located in the remote library branches. A communications interface (C.I.) controller 300 comprises the heart of the central communication unit and serves to connect all input and output communications to and from the central processing unit of the computer. Control and data information into and out of the computer are directed to individual channels or branches of the library system. There is one communication channel for every branch office. Each communication channel in the central communication unit 20 comprises a channel interface 302 and a data set 304. A telephone link TL connects each channel in the central office to the various branch sites. At the branch location the branch controller 30 for each chnnel compirses a data set 306, channel interface 308, program and timing module 310 and input/output (I/O) interface modules 312. The interface modules direct information to and from the various input/output devices such as the optical reader, keyboard and display units. FIG. 2 illustrates 16 separate channels or branches, but it is understood that the number of individual channels is only limited by the size of the computer employed. At the central office the channel interface modules 302 receive serial 8-bit bytes to and from the communications interface controller 300 over the data lines 314. The information is then sent to a data set such as the Vadic model No. VA 301F. After transmission over the telephone link a second data set feeds the eight serial bits to the channel interface 308 for transmission to the program and timing module 310. The program and timing module 310 is analogous to the C.I. controller 300 of the central communications unit 20. The program and timing module prepares all data for transmission and decodes incoming data for transmission to one of the plurality of input/output interface modules 312.

The messages transmitted to and from the C.I. controller are made up of two types of words: data (or instruction) words and control words. The term word (or character) is used to indicate an 8 bit, one byte, code, since this is the smallest unit which is transmitted. FIG. 3 illustrates a typical message. Each word is made up of an 8-bit byte, and the standard "half" ASCII code may be utilized with the eighth bit used as a parity bit. In the preferred embodiment only six bits are actually used for bit information since the seventh bit is used to identify the word as a control word or a data word.

The first byte of the message transmitted is a synchronization character which is identical for all messages. The next byte contains header information which identifies the particular I/O device which is to receive or is transmitting the message. The remaining six bytes are utilized to transmit data or instructions to and from the computer. The EOM byte represents the "end of message" instruction and prepares the parity checking circuits to receive the message parity byte. The message parity byte gives a vertical odd parity for each proceeding bit of the header and data bytes.

The header and data words together with the EOM word are accepted into the computer memory for processing. The SYNC character and the message parity word are generated in the communication interface controller or the branch controllers and are not processed by the computer.

The term control word is used to indicate the SYNC, EOM, message parity and two error control words, a NAK and a PAK. A NAK is a "negative aquisition" signal, one 8-bit character, which is sent by the receiving station whenever an error is detected in the received data. A PAK or "positive acquisition" character, also one byte, is transmitted to affirm that a message was received without errors.

All characters transmitted are in serial asynchronous mode with the least significant bit transmitted first.

Each communication channel is capable of carrying messages in both directions simultaneously, and the NAK or PAK characters may be inserted anywhere between the SYNC and message parity words without interferring with the control sequence, data interpretation or message parity coding.

If a character parity error is detected at the receiving station, the message in transmission or the message just completed is resent. If a message parity error is detected, the previous or last message is resent. The NAK character is utilized in retransmitting data, and it directs the C.I. controller to restart transmission of the current message or may require the C.I. controller to retrieve the previous message from the computer memory and retransmit it to the particular branch station. The C.I. controller also contains a 16 bit register, one bit for each channel, which is used for accumulating the occurrence of character parity errors on the transmission links. These registers provide a real-time record of errors and are periodically addressed by the central processing unit, to keep track of communication transmission accuracy.

2. Memory Storage Structure

Figure 4:
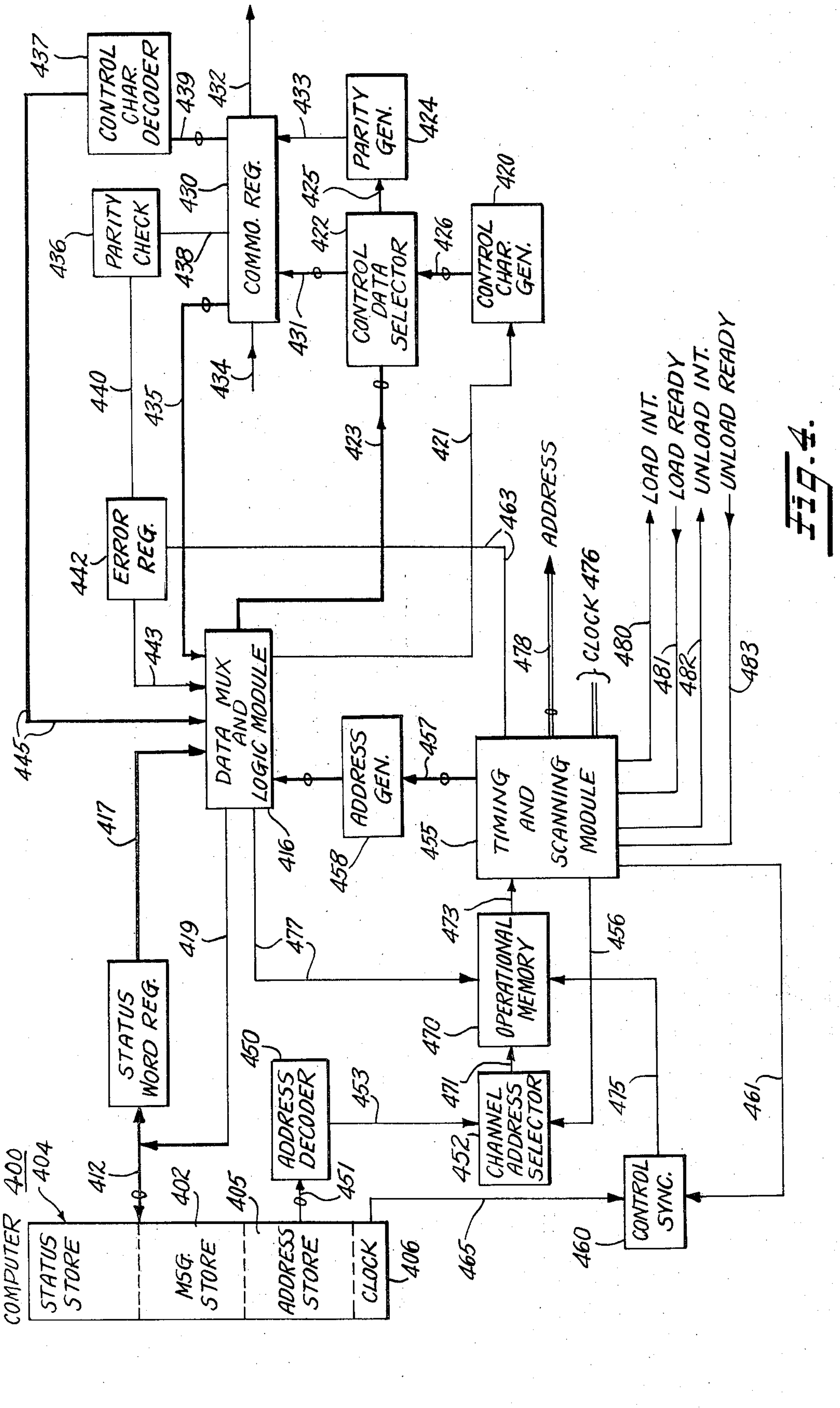
FIG. 4 is a block diagram of the communications interface controller.

The communication interface controller is shown in FIG. 4. The main function of a C.I. controller is to direct the transfer of messages between the computer and the branch sites, to provide checks for communication errors and initiate recovery procedures when these errors are detected. The C.I. controller of FIG. 4 is connected to various storage units in the central processor. The formats of the storage areas 402 and 404 are illustrated in FIGS. **5*a* and 5*b*. Each word in the Nova computer memory is 16 bits. The "computer word" length is thus twice the size as the transmission word length. As illustrated in FIG. 5*a*** each channel, which corresponds to a separate branch, has an incoming (receive) buffer and an outgoing (transmission) buffer. Each incoming and outgoing buffer comprises two separate buffers, an A buffer and a B buffer. A four word message (16 bits) may be stored in both the A and B buffers for each channel. Thus for 16 full duplex channels a total of 256 words of computer memory is required.

Each channel in the transmit and receive buffers is associated with a separate status word as illustrated in FIG. 5*b*. The status words are 16 bit words stored in the Nova memory section 404. The total memory requirement for 16 full duplex channels is 32 words. The status word keeps track of the memory transmission sequence as well as the message parity. For example, during incoming messages (messages going to the computer), the status word is used to notify the computer that the A buffer is full, so that the computer begins loading the B buffer. For outgoing messages, the C.I. controller transmits the B buffer after the A buffer has been transmitted. The computer is not allowed to refill the A buffer until a PAK signal is received which insures that the message was correctly transmitted and correctly received by the branch controller. If a NAK signal is received, the complete message in both buffers is retransmitted.

An expanded view of the status word format is shown in FIG. 5*c*. One bit in the transmit status word is allocated to signify which of the A or B buffers is ready to transmit. A plurality of message count bits keep track of which byte (8-bits) of the message has been transmitted and additional bits are allocated to keep track of the message parity which is updated by the C.I. controller every time a byte is transmitted.

Also illustrated in FIG. 4 are an address storage area 405 and a computer clock output 406 used by the C.I. controller for timing and synchronization purposes.

3. Communications Interface Controller

FIG. 4 illustrates the C.I. controller. The heavy lines utilized throughout the figures are used to indicate the main data flow channels. The C.I. controller comprises a 16-bit status word register 410 connected to the computer 400 by a bidirectional 16-bit high-speed data channel 412. The status word register is connected to a data multiplexer and logic module 416 by data lines 417. A 16-bit data line 419 connects the data multiplexer and logic module to the biderectional bus 412. Data going into and out from the status and message storage sections of the computer is controlled by the data multiplexer and logic module 416. This module is coupled to a control character generator 420 by means of line 421 and to a control data selector 422 by means of 16-bit data bus 423. Control data selector 422 is in turn connected to a parity generator 424 by line 425 and to the control character generator 420 through control lines 426. The control data selector 422 is connected for parallel input to a communications register 430 by a 7-bit line 431. The parity generator 424 is also connected to the communications register 430 via line 433. The communications register 430 provides for serial output to the separate interface modules over output or transmit data channel 432. Serial input from the individual interface modules is received over data line 434. The communication register 430 is a universal shift register which may, for example, comprises two four-bit shift registers such as the Texas Instrument model 74195. Incoming data from the communication register is transmitted to the data multiplexer and logic module 416 by way of eight-bit data line 435. The communication register 430 is also connected to a parity checking module 436 and to a control character decoded 437 via eight-bit data lines 438 and 439 respectively. The parity checking module 436 is connected to the data multiplexer and logic module 416 through line 440, an error register 442 and connecting line 443. The control character decoder 437 is also connected to the data multiplexer and logic module 416 via a control line 445.

The address memory storage unit 405 of the computer 400 is coupled to an address decoder 450 by a six-bit address bus 451. The address decoder 450 is in turn connected to a channel address selector 452 through a four-bit channel 453. The channel address selector may be a standard Quad 2 to 1 multiplexer such as Texas Instrument model 74157. A timing and scanning module 455 is connected to the channel address selector 452 by a four-bit line 456 and is also connected to an address generator 458 through a four-bit channel 457. The timing and scanning module 455 supplies control clock signals to a control synchronization module 460 over line 461 and to the error register 442 over line 463. Line 465 connects the computer clock 406 to the control synchronization module 460. A four by sixteen bit operational memory 470 is connected to the channel address selector 452, the timing and scanning module 455 and the control synchronization module 460 via a four-bit address line 471, line 473 and line 475, respectively. The operation memory may, for example be the Texas Instrument model, No. 7489. The operational memory 470 is also connected by line 477 to the data multiplexer and logic module 416.

The timing and scanning module 455 has several different clock outputs 476, a four-bit address bus 478 and several transfer strobes 480–483 all of which connect to the interface modules. These connections are illustrated in the interface module as shown in FIG. 6. Likewise, the input line 434 and output line 432 of the communication register 430 connect to the individual interface modules as shown in FIG. 6.

The control synchronization module 460 connects to the operational memory 470 to enable functioning strobed by the different clock rates of the computer and the timing the scanning module 455. The control synchronizaiton module switches back and forth between the system clocks of the computer and the C.I. controller without losing any information in the operational memory.

4. Interface Module

The interface module is shown in FIG. 6 and is essentially identical for each of the 16 data channels in both the central communication unit 20 and in the branch controllers 30. For convenience, the interface module is shown connected to the C.I. controller of FIG. 4 and is described below.

The interface module comprises a four-bit address decoder 500, a receive synchronization and control module 502, a transmission synchronization and control module 504, a receive shift register 510 and a transmission shift register 512. The timing and scanning module 455, shown in FIG. 4, is connected to the transmission synchronization and control module 504 by means of the load interrogation line 480 and the load-ready line 481. Similarly, the receive synchronization and control module 502 is connected to the timing and scanning module 455 by means of the unload interrogation line 482 and the unload-ready line 483. The clock pulses from the timing and scanning module 455 are transmitted to the transmission and receive synchronization and control modules by means of the clock lines 476. High and low speed clock pulses are supplied for controlling the high speed data rate between the interface module and the controller 300 and the low speed data rate between the interface module and the data set. Data from the communication register 430 is transmitted by line 432 to the transmission shift register 512. Data received from the branch offices into the shift register 510 is sent to the communication register 430 over the input line 434. The address decoder 500 of the interface module is connected to the receive synchronization and control module 502 by means of line 515 and to the transmission synchronization and control module 504 by means of line 517. The transmission synchronization and control module 504 strobes the transmission shift register 512 over line 520 and the receive synchronization and control module 502 strobes the receive register 510 over line 521. The address decoder 500 receives address signals from the timing and scanning module 455 over address lines 478.

5. Branch Controller

The branch controller 30 is illustrated in FIG. 7 and should be considered together with FIG. 2 illustrating the individual branch controllers connected to the central site communication link. The branch controller 30 contains a data set 306 connected to a channel interface module 308. Channel interface module 308 is connected to a program module 550 by input line 551*a* and output line 551*b*. The program module allows for the proper transmission of data to and from the channel interface module and to the various I/O interface modules. The brach controller further comprises, a reader interface module 552, a keyboard interface module 554, a display interface module 556 and a console interface module 558. The interface modules 552, 554 and 556 are connected to the program module 550 by means of a three bit address bus 560, a six-bit data bus 562 and transfer and control strobe lines 565. The console interface module 558 is connected to the reader interface module 552 by means of a data link 566. The reader interface module 552 is also connected to the reader 50 by cable 205. The input-output console 34 is connected to the console interface module 558 by control lines 571. The keyboard 33 and the display unit 32 are connected to the keyboard interface module 554 and a display interface module 556 by means of lines 573 and 575 respectively. The branch controller also contains a timing module 576 which is used to provide timing signals to each of the various I/O interface modules and to the channel interface module 308.

A high speed data shift clock is supplied to the channel interface module 308 from the program module 550 via line 580 and the address of the interface is set with the address code of the channel interface module 308 through address bus 584. Interrogation and ready lines 585 also couple the program module to the branch interface module.

6. Channel Interface Module

The channel interface module 308 is identical to that of the central site interface controller and is illustrated in FIG. 8. The controller comprises an address decoder 500′, a receive synchronization and control module 502′, a receive shift register 510′, a transmission synchronization and control module 504′ and a transmission shift register 512′. The shift registers 510′ and 512′ are connected to their respective synchronization and control modules 502′ and 504′ via connecting lines 521′ and 520′ respectively. Likewise the synchronization and control modules 502′ and 504′ are connected to the address decoder 500′ by lines 515′ and 517′ respectively. High and low speed clock pulses are supplied to the synchronization and control modules 502′ and 504′ by the program module 550 and by the timing module 576. The input data is connected to the program module via line 551*a* and output data via line 551*b*. Interrogation and ready signals are sent via lines 585*a*–585*d*.

7. Program Module

The program module 550 is illustrated in FIG. 9. The program module itself does many of the same functions as the C.I. controller of FIG. 4. Many of the elements of the program module find their counterpart in the C.I. controller diagram.

The program module comprises an eight bit communication register 600 which is connected to the main six bit data bus 562 by an eight bit parallel output line 604. The output line 604 is connected to a parity checking module 606 by a data lines 607 and to a control character decoder 608 by lines 609. The program module also comprises a multiplexer 610 which is connected to an eight bit by sixteen data word memory 612 through lines 613 and to a control character generator 614 via lines 615. The multiplexer 610 feeds the communication register 600 through a seven bit parallel data bus 617. A parity generator 618 provides the eighth parity bit to the communication register 600. The communication register is connected to the channel interface module 308 (see FIG. 7) by means of input data line 551*a* and an output data line 551*b*.

The program module 550 also contains a data control and logic module 630 which is connected to the communication register 600 and the buffer memory 612 by means of lines 631, 632 and 633. Module 630 is also connected to a data bus 562 by lines 635. A time-out module 634 and a scanner 636 are connected to the data control and logic module 630 by lines 637 and 639 respectively. The scanner 636 is coupled directly to the data bus 562 by means of the six bit line 641. The scanner also provides a three-bit address code over the address bus line 560 which is used to identify the various I/O device. Address bus 584 is set to the proper address of the channel interface module 308 and is connected to the address decoder 500′. (FIG. 8).

The data control and logic module 630 is used to provide transfer strobes to the various I/O interface modules by means of the strobe lines 565*a*–565*d*. In addition a high speed shift data clock signal is fed from the data control and logic module 630 to the channel interface module 308 by clock lines 580. Module 630 also is used to strobe the control character generator 614 over line 680. The data control and logic module 630 is also connected to load interrogate line 585*a*, load-ready line 585*b*, unload interrogate line 585*c* and unload-ready line 585*d*.

SYSTEM OPERATION

1. Controller to Interface Module

The operation of the controller shown in FIG. 4 will be described in connection with the interface module as shown in FIG. 6. The operational description of the controller and interface module is best seen by way of example. The programmed computer may call for a specific output such as a fine display to be sent to a particular I/O device of a particular channel or branch library. The address storage section 405 of the computer is utilized to output a 6-bit code along address bus 451 to the address decoder 450. The address decoder 450 sends a 4-bit channel identifying code, corresponding to the 6-bit channel identifying code from the computer, along the address lines 453 to the channel address selector 452. The address selector is used to feed this 4-bit code into the operational memory 470. The channel address selector 452 is also utilized to connect the timing and scanning module 455 to the operational memory 470. Channel address selector 452 gives priority to signals from the address decoder 450 over the signals from the timing and scanning module 455. Once the 4-bit address is set in the operational memory, the operational memory sends a busy signal over line 473 to the timing and scanning module 455. This busy signal is used to initiate a transmission to the predetermined channel provided the channel itself is not busy. This, the timing and scanning module 455 stops at an address in the operational memory only if a busy signal is received for that address (channel). The timing and scanning module then sends a load interrogate signal over line 480 and the address code over the 4-bit address bus 478 to each of the sixteen interface modules. The address decoder 500 (FIG. 6) of each of the 16 interface modules decodes the address code received along the address bus 478. Only the interface module which corresponds to the unique code on the address bus (one code for each of the 16 interface modules), strobes the corresponding transmission synchronization and control module 504. Assume, for example, interface module X is addressed. If the transmit shift register 512 of interface module X (FIG. 6) is empty at the time the load interrogate signal is received, the transmission synchronization and control module 504 will initiate a load-ready signal along line 481 which is received by the timing and scanning module 455. The timing and scanning module 455 addresses a new channel every two microseconds. Thus, if a load-ready signal is not received within the allotted time, the scanner proceeds to the next address. If the load-ready is received from interface module X, the timing and scanning module 455 generates the associated 4-bit address over line 457 to the address generator 458. The address generator 458 then converts the 4-bit code into a correspinding 16-bit identifying address and feeds this address into the data multiplexer and logic module 416. The proper address code is then sent to the computer over 16-bit data lines 419 and 412.

The address code then allows the computer program to send out the proper transmit or receive status word and locates the proper message storage channel (FIG. 5 *a*) for storage or retrieval of data.

For transmitting data, the computer, upon receipt of the identifying address, retrieves the transmit status word associated with the particular channel. The status word is fed to the 16-bit status word register 410 and then sent to the data multiplexer and logic module 416. The logic circuitry in the data multiplexer and logic module 416 checks the message count of the status word (see FIG. 5 *c*) to determined which part of the message has already been sent. If the message is just beginning, a SYNC pulse is first transmitted by the control character generator 420 and control data selector 422 both of which are strobed by the data multiplexer and logic module. The status word is then updated in the message count field to indicate that the SYNC pulse has been transmitted. The status word is then restored in the computer via data links 419 and 412. If the status word indicated that part of the message had already been sent i.e. the count field was not zero, then the data multiplexer and logic module would strobe the computer to bring out the next computer data word (16-bits). This 16-bit word is then sent to the control data selector 422 via lines 412, 419, data multiplexer and logic module 416, and 16-bit line 423. The control data selector 422 then selects the appropriate half of the 16-bit computer word which have not yet been transmitted. The data bits are then loaded into the communication register 430 and the parity generator sets the parity bit to ensure an even parity count. The status word is updated and restored into the computer memory.

Once the communications register 430 has been loaded the data is serially shifted to the transmission shift register 512 of the interface module X. During this transmission the timing and scanning module 455, addresses interface module X over addres bus 478. The address decoder 500 recognizes its code and responds by storbing the transmission synchronization and control module 504. Module 504 also receives high clock rate signals from the timing and scanning module 455 via one of the lines 476. Data is fed into the transmission shift register 512 in response to the strobes fed by the synchronization and control module 504. Transmission from the shift register is initiated only after all eight bits have been loaded. A low speed transmission rate, compatible with the data set and telephone link requirements is achieved using a low clock rate rom the timing and scanning module via one of the clock lines 476.

Once the complete message has been received by the interface module X, the busy flag in the operational memory 470 is reset and the timing and scanning module no longer stopes at the address of channel interface X.

If an error occurs during transmission of the message, the error is detected in the local branch controller of channel X and a NAK pulse is immediately sent to the C.I. controller. The NAK pulse is decoded in the control character decoder 437 and an error signal sent to the data multiplexer and logic module 416. The status word is reset to zero count by the data multiplexer and logic module so that the message is restarted. To ensure a properly transmitted and received message, the information in memory buffers A and B corresponding to channel X is not destroyed until a PAK signal is decoded by the C.I. controller.

For receiving data from the interface module, the procedure is as follows. The data received from a particular interface module, for example interface module Y, is serially shifted to the communication register 430 over receive line 434. Before the data is shifted to the communication register however, the timing and scanning module 455 must receive an unload-ready signal in response to an unload interrogate signal sent to the interface module Y. If the receive shift register is full and ready to transmit the eight bits to communication register 430, the receive synchronization and control module 502 sends the unload-ready signal to the timing and scanning module 455. The data from the receive shift register 510 is then serially shifted to the communication register 430. The data is directly transmitted to the data multiplexer and logic module 416 via lines 435. The data may then be shifted to computer storage along lines 419 and 412. Preceeding the data shift into computer storage, the address generator 485 and the data multiplexer and logic module 416 prepare a 16-bit message storage address to allow the computer to store the incoming message in the proper location of memory area 402. This buffer address is first fed to the computer via lines 419 and 412. The status word associated with the receive buffer of channel Y is sent to the status word register 410 and the status condition is checked by the data multiplexer and logic module 416. The status word is updated to keep track of the number of bytes in the receive buffer area. If the incoming word is a control word, a SYNC for example, the control character decoder 437 is used to prepare the data multiplexer and logic module 416 to properly handle the incoming word. The control words SYNC, NAK and PAK are handled solely by the C.I. controller and need not be routed through or stored in the computer.

The receive control and data words are also sent to a parity checking circuit 436 which feeds an error register to keep track of the character parity errors associated with each of the sixteen channels. This character parity information may be fed to the computer via the data multiplexer and logic module 416, and thus the computer program may keep a running tabulation of the parity errors along each of the sixteen channel lines. The message parity for each received byte is stored in the status word and continually updated by the data multiplexer and logic module 416. After reception of the EOM byte the logic circuitry in the module 416 compares the computed message parity with that of the subsequently received message parity following the EOM byte. If there are no errors in the message parity the data multiplexer and logic module 416 strobes the control character generator 420 to send a PAK signal to the appropriate interface module i.e. interface module Y.

Thus it can be seen that the basic procedure for transmitting and receiving data is the same. However, the operational memory 470 is only utilized during the transmission process since it is not necessary to interrogate the transmission synchronization and control modules of each of the interface modules unless the computer is ready to send a message. In the receiving procedure, the timing and scanning module only stops at the address which is ready to send data as indicated by the unload ready signal fed to the communication interface controller, in response to the unload interrogation signals.

If the received data word contains a character parity error, the parity checking module 436 signals the data multiplexer and logic module 416 via line 440, register 442 and line 443. The data multiplexer and logic module then sets a busy flag in operational memory via line 477, to indicate that a NAK pulse should be sent to interface channel Y as soon as that channel is not busy. When the timing and scanning module 455 services the Y address, the NAK pulse is generated by the control character generator 420 so that the message will be repeated by the branch Y. The receive status word corresponding to channel Y is reset to a zero count and the re-transmitted message is ready to be received.

2. Central Interface to Branch Controller

Once the data has been transmitted from the communication register 430 (FIG. 4) and properly shifted into the transmit shift register 512 of the central interface module (FIG. 6), the data is transmitted to a data set and channel interface module at a branch site as illustrated in FIG. 2. At the local branch, the channel interface module 308 receives the serial data from the data set into the receive register 510′ (see FIG. 8). The timing module 576 of the branch controller (FIG. 7) is used to strobe the low speed data into the receiving shift register 510′. Referring now to FIG. 7, the data in the shift register 510′ is transmitted to the program module 550 where it is properly decoded and checked both for character and message parity errors. The complete message is stored in a buffer within the program module until the appropriate I/O interface module is ready to receive the data. In the example of a fine to be displayed on the display 32, the program module would first intitate interrogation strobes over lines 565 to the display interface module 556. If the display interface module is not busy, a ready signal is sent back to the program module to initiate a data transfer. The memory then stored in the program module memory buffer is transferred by means of the data bus line 562 to the appropriate I/O interface module, as for example, the display interface module. Whenever a message is sent to a particular I/O interface module, the address associated with that module is also transferred on the address bus 560. The DC level address is held constant during the data transfer and only the particular I/O interface module having that particular address is responsive to the data being transmitted or received. The console interface module 558 is connected directly to the reader interface module 552. The connecting bus lines 556 serve to transfer data and to address and strobe the console interface module.

3. Program Module

The program module is illustrated in FIG. 9. Data received from the channel interface module 308 is sent in serial mode to the communication register 600 along the input lines 551*a*. Data received in the communication register is transmitted along the parallel data lines 604, 562 and 603 to the memory buffer 612. The memory buffer is divided into sixteen eight-bit words, and half of the buffer memory is used for transmitting data while the other half is used for receiving data. The incoming data is fed to a character parity checking module 606 and to a control character decoder 608. If the character received is a control word, such as a SYNC, PAK, NAK or EOM, the control character decoder prepares the data control and logic module 630 for special operating procedures in order to handle the control word. For data reception however, the data control and logic module 630 permit the storage of the data in the memory buffer 612. The parity checking circuit 606 checks the character parity of each byte, eight bits, upon transfer out of the communication register 600. The message parity is compiled and stored in the buffer memory 612 and is constantly updated each time a new word is received, and the message parity word is stored as part of the message. The updating of the message parity is similar to the updating done by the C.I. controller 300. After the completed message parity has been computed and checked out, the message is sent to the appropriate input/output device through the data channel 613, data multiplexer 610, data lines 617, communication register 600, output lines 604 and data bus 562. The header information, which identifies the particular I/O device to receive the data is read by the scanning module 636 which in turn addressed the appropriate device over the address bus 560.

If a parity check error is discovered in the parity checking module 606 or if a message parity is incorrect after the final message has been received, the data control and logic module 630 will initiate a strobe to a control character generator 614 over line 680. The control character generator will then generate a NAK pulse which is transmitted through the multiplexer 610 and communication register 600 to the channel interface controller and on to the central site. At the central site the NAK pulse is restarted by the communications interface controller and the message is restarted from the beginning.

The time-out module 634 is simply a counter circuit which insures that the computer and branch controllers do not hang-up in the event of a message transmission error. For example, if a message transmitted to the computer is partially destroyed for interference over the telephone lines, the C.I. controller will see only a noise signal and consequently not respond with a NAK or PAK. In this event the time-out counter will initiate automatic repetition of the message. The time-out module will continuously initiate re-transmission of the message until a NAK or PAK is received. Likewise, if the message to the branch controller is not received within a preset time (for example, ½ – 1 sec.), a NAK pulse is initiated by the time-out circuit which causes the repetition of the message from the central computer. Thus, messages along both directions of the communication link are protected from being lost by line interference by the branch time-out modules. The time interval present in the counter is adjusted to reflect the maximum or worst total transmission time.

Although the invention has been described with particular reference to a library circulation system, it is evident that the communication system may be utilized in a wide variety of environments. FIG. 10 illustrates the use of the communication system for transmitting messages to and from a remote site utilizing radio waves instead of telephone lines. The system may be utilized to provide a communication link between a central police station and a pluraltiy of police cars. A central station 800 houses the central computer 802, which contains memory storage areas, the appropriate interface 804 and transmitting and receiving equipment 806. A local police car 810 is provided with transmitting/receiving unit 812 coupled to an interface module 813 and a console 814 which is utilized as an I/O device and may comprise a cathode ray tube together with a keyboard. The interface module 813 also contains the buffer storage area. As an example of the operation, the patrol officer may intital a request with regard to a particular street location, an apprehended suspect, license plate number and the like. The message is transmitted to the central station and fed to the computer which provides output data depending upon the particular information requested. For example, a license plate number may be printed on a keyboard of the I/O device 814 and transmitted to the central station. The computer 802 then is utilized to trace the registered owner of the automobile and the owner's name and address would then be transmitted to the requesting patrol car for display on the cathode ray tube of the I/O device 814. The positive and negative acquisition pulse would be utilized in a similar fashion as described above in connection with the library circulation system. In addition, each patrol car would contain a time out module 816 to prevent any hang ups between the central station and the various remote patrol cars. For example, the code corresponding to a particular license plate is transmitted to the central station. The central interface transmits a PAK signal or NAK signal depending upon the condition of a correct or incorrect reception respectively. If neither a PAK or NAK is sent to the police car, the time-out module within the car initiates the retransmission of the code until a PAK pulse is ultimately received. If the message to the central station is correctly received a PAK signal is sent to the local police car. The output data from the central computer is then transmitted to the police car. If the message is correctly received a PAK signal is sent to the central station. If there are errors in the received signal a NAK pulse is transmitted to the central station. If a complete message is not received from the cental station within a pre-set time interval, the time-out module initiates the transmission of a NAK pulse which initiates the retransmission of the complete message from the central station.

Although the invention has been described with reference to the preferred embodiments, it is to be understood that charges and modifications may readily be made by those skilled in the art without deviating from the spirit and scope of the present invention defined by the appended claims.

We claim:

1. A data communications system for communication between a central station and a branch station said central station comprising:

a. means for transmitting a message, said message comprising:
   i. a plurality of data words, each data word having a plurality of character bits,
   ii. a character parity bit associated with each data word, and
   iii. a message parity word associated with said pulrality of data words forming the transmitted message, b. message storage means for storing messages to be transmitted, said message storage means having a first transmit buffer and a second transmit buffer, c. status word storage means associated with said first and second buffers for storing a status word, said status word comprising:
   i. a first portion for indicating the data word to be transmitted in the message,
   ii. a second portion for indicating the message parity count for transmitted data words, said second portion indicating said message parity word upon transmission of said message, and
   iii. a third portion for identifying the first and second transmit buffers, d. message handling means connected to said message storage means, status word storage means, and said message transmitting means, e. message processing means connected to said message storage means for loading messages into said message storage means, f. means for receiving a positive acquisition signal and negative acquisition signal, said signal receiving means connected to said message handling means, and said branch station comprising:

g. means for receiving messages from said central station, h. means for detecting bit character errors and bit message means, said error detecting means connected to said message receiving means, i. signal transmitting means for transmitting a positive acquisition signal upon the reception at said branch station of a message having neither character nor message bit errors and for transmitting a negative acquisition signal upon the detection of either a character or message bit error, said signal transmitting means connected to said error detecting means, whereby said negative acquisition signal when received in said central station causes said messages handling means to access said message storage means for retransmitting the message stored in said message storage means, and the positive acquisition signal when received in said central station permits the loading of a new message into said message storage means.

2. A data communication system as recited in claim 1 wherein said system further comprises:

a. message receiving means in said central station connected to said message handling means, b. means for detecting bit character errors and bit message errors at said central station, said error detecting means of said central station connected to said message receiving means of said central station and said message handling means, c. means in said central station for transmitting a positive acquisition signal upon the reception of a message having neither character bit errors nor message bit errors, and for transmitting a negative acquisition signal upon the detection of either a character or message bit error, said signal transmitting means of said transmitting station connected to said message handling means, d. means in said branch station for transmitting a message, e. a message storage buffer at said branch station for storing said transmitted message of said branch station, f. message handling means in said branch station connected to the message storage buffer, the message transmitting means of said branch station and said message receiving means of said branch station, g. signal receiving means in said branch station connected to said message handling means of said branch station for receiving positive acquisition signals and negative acquisition signals from said central station, and h. terminal input means at said branch station connected to said message handling means of said branch station and said message storage buffer for loading messages into said message storage buffer, whereby said negative acquisition signal when received at said branch station causes the retransmission of the message stored in said message storage buffer, and the positive acquisition signal when received at said branch station permits the loading of new messages into said message storage buffer.

3. A data communication system as recited in claim 2 wherein said central and branch stations have data storage means connected respectively to said central and branch message handling means for storing said received messages.

4. A data communications system as recited in claim 2 wherein said branch station further comprises a presetable timing device connected to said message handling means of said branch station for causing the retransmission of the message stored in said message storage buffer when neither a positive acquisition signal nor a negative acquisition signal is received within the preset time interval.

5. A data communications system for communication between a central station and a plurality of branch stations, said central station comprising:

a. means for transmitting a message, said message comprising:

i. a plurality of data words, each data word having a plurality of character bits, ii. a character parity bit associated with each data word, and iii. a message parity word associated with said plurality of data words forming the transmitted message, b. a plurality of message storage means in said central station, each message storage means associated with a branch station for storing messages for transmission to each of said branch stations, each message storage means having a first transmit buffer and a second transmit buffer, c. a first plurality of status word storage means for storing status words, one status word associated with each message storage means, said status word providing an indication of the message parity count for transmitted data words, d. a message handling means connected to said plurality of message storage means, said first plurality of status word storage means and said message transmitting means, e. message processing means connected to said message storage means for loading messages into said message storage means, f. means for receiving a positive acquisition signal and negative acquisition signal, said signal receiving means connected to said message handling means, and each of said branch stations comprising:

g. means for receiving messages from said central station, h. means for detecting bit character errors and bit message errors, said error detecting means connected to said message receiving means, i. signal transmitting means for transmitting a positive acquisition signal upon the reception at said branch station of a message having neither character nor message bit errors and for transmitting a negative acquisition signal upon the detection of either a character or message bit error, said signal transmitting means of said branch station connected to said error detecting means, whereby said negative acquisition signal when received in said central station from a given branch station causes said messages handling means to access said associated message storage means for retransmitting the message to said given branch station, and the positive acquisition signal when received in said central station from a given branch station permits the loading of a new message into said associated message storage means.

6. A data communications system as recited in claim 5 further comprising:

a. message receiving means in said central station connected to said message handling means, b. means for detecting bit character errors and bit message errors at said central staiton, said error detcting means of said central station connected to said message receiving means of said central station and said message handling means, c. means in said central station for transmitting a positive acquisition signal upon the reception of a message having neither character bit errors nor message bit errors, and for transmitting a negative acquisition signal upon the detection of either a character or message bit error, said signal transmitting means of said transmitting station connected to said message handling means, d. means in each branch station for transmitting a message, e. a message storage buffer at each of said branch stations for storing said transmitted message, f. message handling means in each of said branch stations connected to said message storage buffer, the message transmitting means of said branch station and the message receiving means of the branch station, g. signal receiving means in each of said branch stations connected to said message handling means of said branch station for receiving positive acquisition signals and negative acquisition signals from said central station, and h. terminal input means at each of said branch stations connected to said message handling means of said branch station and said message storage buffer for loading messages into said message storage buffer, whereby said negative acquisition signal when received at said branch station causes the retransmission of the message stored in said message storage buffer, and a positive acquisition signal when received at said branch station permits the loading of new messages into said message storage buffer.

7. A data communications system as recited in claim 6 wherein said central and each of said branch stations have data storage means connected respectively to said central and branch message handling means, for storing said received messages.

8. A data communications system as recited in claim 7 wherein said data storage means of said central station comprises a plurality of data storage means, each data storage means associated with a branch station for storing messages received from each branch station, each of said plurality of data storage means having a first receive buffer and a second receive buffer.

9. A data communications system as recited in claim 8 wherein said central station further comprises a second plurality of status word storage means connected to said message handling means of said central station, each of said second plurality of status words associated with one data storage means of said central station for providing an indication of the message parity count for received data words.

10. A data communications system as recited in claim 7 wherein each of said branch stations further comprises a presetable timing device connected to said message handling means of said branch station for causing the retransmission of the message stored in said message storage buffer when neither a positive acquisition signal nor a negative acquisition signal is received within the present time interval.

11. A method of transmitting messages from a central station to a plurality of branch stations, each message having a plurality of data words, each data word having a plurality of character bits and a character parity bit associated with each data word and said message having a message parity word associated with said plurality of data words forming the message comprising the steps of:

a. storing messages in a plurality of message storage areas at the central station, one message storage area associated with each branch station, b. storing a plurality of status words at a central station, one status word associated with each message storage area, each status word indicating a message parity count, c. transmitting to one branch station data words of a stored message, d. receiving said transmitted data words at said one branch station, e. detecting character parity errors in said data words at said one branch station, f. transmitting a negative acquisition signal at said one branch station to said central station upon detection of a character parity error in any received data word, g. transmitting at said central station a message parity word as indicated by said message parity count of said status word associated with the message storage area of said one associated branch station, h. receiving said transmitted message parity word at said one branch station, i. detecting message parity errors at said one branch station, j. transmitting a negative acquisition signal at said one branch station to said central station upon detection of a message parity error in said message parity word, and transmitting a positive acquisition signal to said central station if no message parity errors are detected in said message parity word, k. terminating transmission of data words at said central station upon receipt of a negative acquisition signal at said central station from said one branch station, and re-transmitting data words from said associated message storage area of said one associated branch station.

l. storing a new message in said message storage area of said one associated branch station upon receipt at said central station of a positive acquisition signal.

* * * * *

UNITED STATES PATENT OFFICE
CERTIFICATE OF CORRECTION

Patent No. 3,824,547 Dated July 16, 1974

Inventor(s) Wendel C. Green, Charles W. Webster, Patrick J. Sharkitt and Richard R. Hayden It is certified that error appears in the above-identified patent and that said Letters Patent are hereby corrected as shown below:

The name of the second inventor should read:

--Charles W. Webster --

<u>In the Specification</u>:

Column 3, line 14, correct the spelling of "example".

Line 35, correct the spelling of "channel" and "comprises".

Column 5, line 42, correct the spelling of "bidirectional".

Line 60, change "comprises" to -- comprise --.

Column 10, line 22, correct the spelling of "address" and in line 24, correct the spelling of "strobing".

Column 13, line 19, change "for" to -- from --, and in line 54, correct the spelling of "initial".

<u>In the Claims</u>:

Claim 1, column 15, line 4, "means", first occurrence, should read -- errors --.

Claim 6, column 17, line 6, correct the spelling of "station", and in line 7, correct the spelling of "detecting".

Signed and sealed this 15th day of October 1974.

(SEAL)
Attest:

McCOY M. GIBSON JR.
Attesting Officer

C. MARSHALL DANN
Commissioner of Patents